United States Patent
Nakae

(10) Patent No.: US 8,966,939 B2
(45) Date of Patent: *Mar. 3, 2015

(54) METHOD FOR PRODUCING GLASS SUBSTRATE FOR INFORMATION RECORDING MEDIUM

(75) Inventor: Hazuki Nakae, Kyoto (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/638,748

(22) PCT Filed: Mar. 10, 2011

(86) PCT No.: PCT/JP2011/001410
§ 371 (c)(1),
(2), (4) Date: Oct. 1, 2012

(87) PCT Pub. No.: WO2011/121903
PCT Pub. Date: Oct. 6, 2011

(65) Prior Publication Data
US 2013/0029099 A1  Jan. 31, 2013

(30) Foreign Application Priority Data
Mar. 29, 2010 (JP) .................. 2010-075324

(51) Int. Cl.
B24B 7/00 (2006.01)
C03C 3/04 (2006.01)
B24B 37/04 (2012.01)
G11B 5/84 (2006.01)
C03C 3/095 (2006.01)
C08C 19/00 (2006.01)
G11B 5/73 (2006.01)

(52) U.S. Cl.
CPC .............. *G11B 5/8404* (2013.01); *C03C 3/095* (2013.01); *C08C 19/00* (2013.01); *G11B 5/7315* (2013.01)
USPC .................... 65/61; 428/410; 451/41; 451/37

(58) Field of Classification Search
CPC  C03C 23/0075; C03C 2203/50; C03C 3/095; C03C 19/00; G11B 5/8404; G11B 5/7315
USPC ............. 501/7, 63, 64, 66, 67, 68, 69, 70, 71, 501/30.14; 428/846.9, 410, 64.2, 141; 65/90, 95, 99.1, 61, 30.1, 60.1; 451/41, 451/37

See application file for complete search history.

(56) References Cited

U.S. PATENT DOCUMENTS

| | | | |
|---|---|---|---|
| 7,959,493 B2 | 6/2011 | Horie et al. | |
| 8,093,167 B2 | 1/2012 | Yagi et al. | |
| 8,903,167 B2 | 1/2012 | Yagi et al. | |
| 8,114,795 B2 | 2/2012 | Yagi et al. | |
| 8,585,463 B2 * | 11/2013 | Nakae | 65/61 |
| 2002/0121110 A1 * | 9/2002 | Saito et al. | 65/30.14 |
| 2006/0188756 A1 * | 8/2006 | Kezuka et al. | 428/846.9 |
| 2009/0162608 A1 | 6/2009 | Yagi et al. | |
| 2010/0048375 A1 | 2/2010 | Horie et al. | |
| 2010/0285726 A1 | 11/2010 | Ueda et al. | |
| 2011/0086241 A1 * | 4/2011 | Hachitani et al. | 428/846.9 |
| 2011/0136651 A1 | 6/2011 | Yagi et al. | |
| 2011/0171415 A1 * | 7/2011 | Eda et al. | 428/64.2 |

FOREIGN PATENT DOCUMENTS

| | | | |
|---|---|---|---|
| JP | 9-194229 | 7/1997 | |
| JP | 2000-343390 | 12/2000 | |
| JP | 2001-326200 | 11/2001 | |
| JP | 2005-51099 | 2/2005 | |
| JP | 2005-203507 | 7/2005 | |
| JP | 2007-191696 | 8/2007 | |
| JP | 2008-246645 | 10/2008 | |
| JP | 2009-157968 | 7/2009 | |
| JP | 2009-193608 | 8/2009 | |
| JP | 2010-1201 | 1/2010 | |
| WO | WO 2009/116278 | 9/2009 | |
| WO | WO 2009/157306 | 12/2009 | |
| WO | WO 2010/001743 | 1/2010 | |
| WO | 2010038741 | * 8/2010 | G11B 5/73 |

OTHER PUBLICATIONS

Machine translation Konica (JP 2009193608) Aug. 2009.*
Machine translation Nippon Sheet Glass (JP 2000343390) Dec. 2000.*

* cited by examiner

*Primary Examiner* — Kevin M. Bernatz
*Assistant Examiner* — Louis Falasco
(74) *Attorney, Agent, or Firm* — Brinks Gilson & Lione

(57) ABSTRACT

Disclosed is a method of producing a glass substrate for an information recording medium including a rough polishing step of performing a rough polishing on a glass material containing 0.01 to 2 mass % of cerium oxide; a washing step of washing the glass material after the rough polishing step, so that the cerium content of the glass material surface becomes 0.125 ng/cm$^2$ or less; and a precision polishing step of performing precision polishing on the glass material after the washing step by cyclically using a polishing material containing colloidal silica.

4 Claims, No Drawings

METHOD FOR PRODUCING GLASS SUBSTRATE FOR INFORMATION RECORDING MEDIUM

RELATED APPLICATIONS

This is a U.S. National Phase Application under 35 USC 371 of International Application PCT/JP2011/001410 filed on Mar. 10, 2011.

This application claims the priority of Japanese Application No. 2010-075324 filed Mar. 29, 2010, the entire content of which is hereby incorporated by reference.

TECHNICAL FIELD

The present invention relates to a method of producing a glass substrate for an information recording medium.

BACKGROUND ART

In recent years, demands for a glass substrate as the base material (substrate) of information recording mediums as represented by a magnetic hard disk drive are increasing.

In order to realize a higher recording density of an information recording medium, the glass substrate as the substrate is subject to a plurality of polishing steps with a high degree of accuracy such as a rough polishing step, a precision polishing step, and so on. In the foregoing polishing steps, high smoothness and high cleanliness of the glass material is demanded, and the improvement of productivity is also required.

As a method of achieving high smoothness, known is the method of using silica-based abrasive grains such as colloidal silica in the final polishing step, and the cyclic use of the silica-based abrasive grains is known as the means for simultaneously improving the productivity (Patent Document 1).

Meanwhile, environmental measures are being sought by society. Information recording mediums such as hard disk drives (HDD) are no exception, and various demands such as low noise and low energy are being made. For instance, a glass raw board that is used as the substrate of the foregoing information recording mediums is demanded of the non-inclusion of antimony, which is used for defoaming. As an alternative component of antimony, cerium oxide is often used. Roughly 0.1 to 2 mass % of cerium oxide is contained in the glass raw board composition.

Patent Document 1: Japanese Patent Application Publication No. 2008-246645

SUMMARY OF THE INVENTION

An object of this invention is to provide a method of producing a glass substrate for an information recording medium in which, when cyclically using colloidal silica as a polishing material upon subjecting a glass material containing cerium oxide in the composition thereof to precision polishing, limitation in the number of times of colloidal silica cyclical usage is avoided, whereby the productivity is dramatically improved.

Specifically, a first aspect of the present invention is a method of producing a glass substrate for an information recording medium, this method including: a rough polishing step of subjecting a glass material containing 0.01 to 2 mass % of cerium oxide to rough polishing; a washing step of washing the glass material, which has been subjected to the rough polishing step, so that the cerium content of the glass material surface becomes 0.125 ng/cm$^2$ or less; and a precision polishing step of subjecting the glass material, which has been subjected to the washing step, to precision polishing by cyclically using a polishing material containing colloidal silica.

Moreover, a second aspect of the present invention is a glass substrate for an information recording medium produced with the foregoing production method.

DETAILED DESCRIPTION OF PREFERRED EMBODIMENTS

Conventionally, when silica-based abrasive grains are cyclically used as the polishing material, there is a problem in that, with the lapse of time, the silica-based abrasive grains become clumped and can no longer be used as a polishing material.

As the means for resolving the foregoing problem, that is a technique of removing the clumped silica-based abrasive grains using a filter. Nevertheless, with this technique, there is a problem in that, when the clumped silica-based abrasive grains are finer than the filter, the silica-based abrasive grains pass through the filter, and is ineffective. Particularly in recent years, since silica-based abrasive grains of roughly 20 nm are often used, no effect is yielded when a normal filter is used. Meanwhile, if the filter pores are small, the clumped silica-based abrasive grains become clogged and cannot be processed. Consequently, the number of times that the polishing material can be cyclically used was limited to roughly three times, and there was a problem in that the production efficiency would deteriorate as a result thereof.

As a result of intense study, the present inventor discovered that the cause of the clumping of the polishing material is cerium oxide, which is broadly used as a rare earth oxide.

Cerium oxide has a polishing mechanism. In this polishing mechanism, cerium oxide becomes a substitute in the coupling of Si—O, which is the main composition on the surface of a glass material, upon being subject to pressure, and coupling of Ce—O occurs. While these couplings are broken down quickly, the Si that was cut off becomes separated without re-coupling. Polishing is performed by repeating the foregoing process.

When cerium oxide exists upon performing polishing using silica-based abrasive grains, cerium couples with the hydroxyl group of the silica-based abrasive grains, and the dispersibility of the silica-based abrasive grains thereby deteriorates. The reason for this is considered to be because the foregoing polishing mechanism of the cerium oxide also occurs in the silica-based abrasive grains (and sludge). Consequently, when the slurry is cyclically used, the clumping of the silica-based abrasive grains increases, and inflicts and adverse effect on the smoothness of the glass substrate. Moreover, since cerium oxide becomes accumulated in the polishing machine, the adverse effect on the smoothness will further increase. In addition, cerium oxide infiltrates the glass material deeply by remaining until the final process, and has an adverse effect on the cleanliness of the final glass substrate.

In a glass substrate containing cerium oxide as the alternative component of antimony, the cerium oxide that is eluted from the glass substrate during polishing will also have the same problems as the cerium oxide that is used as the polishing material during rough polishing. The cerium oxide that is eluted from the glass composition is of various sizes and electronic states, and it is assumed that this yields a state where the silica-based abrasive grains become more easily clumped together.

Accordingly, in a glass substrate containing cerium oxide, since the clumping of the silica-based abrasive grains occurs notably, it has become known that this limits the number of times that the silica-based abrasive grains can be cyclically used.

Based on the foregoing discovery, the present invention was devised in view of the foregoing problems.

The preferred embodiments and examples of the present invention are now explained. Nevertheless, the present invention is not limited to the production methods of the ensuing embodiments and examples.

The glass substrate for an information recording medium according to this embodiment is used, for example, as a circular base material (substrate) suitable for a magnetic hard disk as an information recording medium. The production process of the glass substrate includes a step of molding a circular disk-shaped glass material via press working and drilling process, a lapping step, a rough polishing step, a washing step, and a precision polishing step, and is completed after additionally performing a washing step.

(Glass Material)

As the glass composition to become the material of the glass substrate, preferably used is a glass composition in which the main component contains 55 mass % to 75 mass % or less of $SiO_2$, 5 mass % or more and 18 mass % or less of $Al_2O_3$, 1 mass % or more and 10 mass % or less of $Li_2O$, 3 mass % or more and 15 mass % or less of $Na_2O$, 0.1 mass % to 5 mass % of $K_2O$, 0.1 mass % to 5 mass % of MgO, 0.1 mass % to 5 mass % of CaO, and 0 mass % to 8 mass % of $ZrO_2$, wherein the total amount of $Li_2O+Na_2O+K_2O$ is 10 mass % to 25 mass %, and the mass ratio of $(MgO+CaO)/(Li_2O+Na_2O+K_2O)$ is 0.10 or more and 0.80 or less.

Moreover, as another embodiment, used may be a glass material in which the total amount of $SiO_2+Al_2O_3+B_2O_2$ is 65 mass % to 90 mass % (provided that $SiO_2$ is 45 mass % to 75 mass %, $Al_2O_3$ is 1 mass % to 20 mass %, and $B_2O_3$ is 0 mass % to 8 mass %), the total amount of $R_2O$ is 7 mass % to 20 mass % (provided that R is, Li, Na, K), the total amount of R'O is 0.1 mass % to 12 mass % (provided that R' is Mg, Ca, Sr, Ba, Zn), and the total amount of $TiO_2+ZrO_2$ is 0.5 mass % to 10 mass %, wherein the glass material contains at least one type of polyvalent element selected from a group of V, Mn, Ni, Mo, Sn, Ce and Bi, and, when oxides of the polyvalent elements are respectively $V_2O_5$, $MnO_2$, $Ni_2O_3$, $MoO_3$, $SnO_2$, $CeO_2$, and $Bi_2O_3$, a molar ratio of a total amount of oxides of the polyvalent elements relative to the total amount of $TiO_2+ZrO_2$ (total amount of oxides of the polyvalent element/(total amount of $TiO_2+ZrO_2$)) is within a range of 0.05 to 0.50.

The foregoing glass compositions preferably do not contain phosphorus oxide. In addition to the foregoing composition, cerium oxide is added in an amount of 0.01 to 2 mass % as an alternative component of antimony for use in defoaming. The cerium oxide content is more preferably 0.5 to 1 mass %. This is because the defoaming effect is also yielded in the foregoing range, and the eluted amount will be small during the polishing process.

A circular glass material that is molded via press molding is subject to grinding process (lapping step) using a relatively coarse diamond grindstone. The lapping step may be performed once, and is preferably performed twice.

(Rough Polishing Step: Main Surface Rough Polishing Step)

Foremost, a rough polishing step is performed to the main surface of the glass material that was subject to the lapping step. This rough polishing step is performed with an objective of removing the scratches and strain remaining after the foregoing lapping step, and performed using a polishing machine (more specifically, a polyurethane-based hard polishing pad). Specifically, a polishing material containing a rare earth oxide having a fluorine content of 5 mass % or less; that is, cerium oxide, as its main component is supplied to the glass material, and the abrasive cloth and the glass material are moved relatively so as to subject the main surface of the glass material to rough polishing. The average grain size of the polishing material used in the rough polishing step is preferably 1 μm.

In the rough polishing step, cerium oxide is used as the polishing material. In this embodiment, Si is cut off at the surface of the glass material based on the polishing mechanism of the cerium oxide, and highly productive polishing can be realized. In addition, since a considerable amount of the residual cerium oxide is removed in the washing step, not only is it possible to maintain the high level of cleanliness of the glass material, it is also possible to inhibit, as much as possible, the infliction of an adverse effect to the polishing material in the precision polishing step to be performed after the washing step. Accordingly, it is possible to maintain a high level of smoothness, cleanliness and productivity.

(Washing Step: Post-Rough Polishing Washing Step)

The glass material that was subject to the rough polishing using the cerium polishing material is washed in the post-rough polishing washing step. Foremost, washing is performed using an alkali detergent of pH 13 or higher, and the glass material is rinsed. Subsequently, the glass material is washed using an acid-based detergent of pH 1 or less, rinsed, and finally washed with a hydrofluoric acid (HF) solution. With respect to the cerium oxide, it is most efficient to perform the washing in the order of alkali washing, acid washing, and HF. This is because the polishing material can be foremost dispersed and removed with the alkali detergent, the polishing material can be subsequently dissolved and removed with the pickling agent, and the polishing material that is deeply stuck in the glass, as a result of etching the glass, can be ultimately removed with the HF.

Here, when these series of washing processes are performed using a single bath, efficient washing cannot be performed. In particular, when the pickling agent and HF are placed in the same bath, the etching rate of HF will deteriorate at many locations of the polishing material, and the uniform etching in the substrate becomes impossible. Moreover, it is preferable to use a rinse bath after the respective washing steps. These detergents may also be added with a surface-active agent, a dispersing agent, a chelate agent, a reducing agent or the like as the case may be. Moreover, preferably, ultrasonic waves are applied to the respective washing tanks, and degassed water is used in the respective detergents. In addition to the above, when cerium oxide is being used in the lapping step (inner diameter processing, outer diameter processing), HF washing is preferably performed after each of the foregoing processes.

Prior to performing the precision polishing step, since the glass material that was subject to rough polishing is washed so that the cerium oxide of the glass material surface becomes a small amount (0.125 ng/cm$^2$ or less), the cerium oxide which causes the clumping of colloidal silica is reduced. Thus, the number of times that the polishing material can be cyclically used will increase, and the productivity will also improve. In addition, since the washing step is performed before the precision polishing step, even when a glass material containing 0.01 to 2 mass % of cerium oxide is used, it is possible to inhibit the clumping of the slurry in the precision polishing step. Accordingly, even when an environment-friendly material is used, it is possible to improve the productivity. In addition, since the amount of cerium adhered to the glass material is reduced before the precision polishing step, it is possible to ensure the cleanliness of the final glass substrate.

In addition, strong acid is required since cerium oxide has difficult solubility. Nevertheless, strong acid deteriorate the smoothness of the glass substrate (glass material). Consequently, in this embodiment, the washing step is carried out before the final precision polishing step so as to dissolve and wash cerium. Thus, even when strong acid is used, there will be no adverse effect on the smoothness of the glass substrate. Moreover, the smoothness of the glass substrate as the final product will also improve.

(Precision Polishing Step)

Subsequently, the same polishing machine that was used in the rough polishing step is used once again, and the precision polishing step is performed upon replacing the polishing pad from a hard polishing pad to a soft polishing pad. The treatment to be performed in this precision polishing step is a mirror polishing treatment to realize a smooth and flat mirror finish in which the surface roughness (Rmax (maximum height of minute undulations)) of the main surface becomes roughly 6 nm or less while maintaining the flat and smooth main surface that was obtained in the foregoing rough polishing step. As the polishing material, preferably used is a polishing material containing colloidal silica having an average grain size of 20 nm, which is smaller than the grain size of the cerium-based polishing material that was used in the rough polishing step.

The polishing solution (slurry) containing the foregoing polishing material is supplied to the glass material, and the polishing pad and the glass material are relatively moved so as to subject the surface of the glass material to mirror polishing. Here, the amount (machining allowance) to be polished in the precision polishing is 0.2 to 2 μm, and preferably 0.3 to 1.5 μm. It is not possible to ensure the flatness and smoothness when the amount to be polished is 0.2 μm or less, and the cerium content will increase when the amount to be polished is greater than 2 μm. Moreover, when polishing is performed in the foregoing range of 0.3 to 1.5 μm, it is possible to ensure flatness and smoothness, as well as sustainability (cyclically use).

The slurry is cyclically used, for example, according to the method disclosed in Japanese Patent Application Publication No. 2008-246645, which was previously proposed by the present Applicant. Upon cyclically using the slurry, the respective data are managed such that, when a volume of a slurry used as the polishing material in the precision polishing step is (a) liters, number of the glass materials to be polished is (b), cerium oxide content of the glass material is (X) mass %, and the machining allowance is (Y) μm, $$\text{and } Z = Y \times \text{substrate area (cm}^2) \times \text{substrate density (g/cm}^3) \quad (1)$$

the precision polishing step cyclically uses the polishing material so as to satisfy the following formula:

$$(X \times Z) \times b/a < 3 \ (\mu g/l) \quad (2).$$

In this embodiment, upon managing the number of times of cyclically using the slurry that is used as the polishing material in the precision polishing step, it is possible to obtain the maximum number of cyclic uses by giving consideration to the cerium oxide of the glass material to be polished. In a certain embodiment, when the volume (a) of the slurry is 30 liters, the number of glass material (b) will be roughly 100 glass materials.

(Washing Step: Post-Mirror Polishing Washing Step)

The final washing step of the glass material that was subject to the foregoing precision polishing step (principal surface mirror polishing step) is performed as follows.

Foremost, without drying the glass material (including natural drying) that was subject to the precision polishing step, the glass material is stored in water and transported to the subsequent washing step in a wet state. This is because, if the glass material in a state of containing polishing residue is dried, it becomes difficult to remove the polishing material (colloidal silica) in the final washing step. The polishing material needs to be removed without damaging the surface of the mirror-polished glass material. For example, in the case of a wash solution that has an etching effect or a leaching effect on the glass material, the mirror-polished glass surface is unfortunately damaged, and becomes a finished surface of a pear skin pattern. With a finished surface of a pear skin pattern, it is not possible to sufficiently reduce the floating quantity of the magnetic head. Accordingly, preferably used as the wash solution is a type that does not have an etching effect or a leaching effect on glass, and which is of a composition comprising selective solubility relative to a silica-based polishing material. In other words, it is preferable to select a wash solution having a composition that does not include hydrofluoric acid (HF), hydrofluosilicic acid ($H_2SiF_6$) or the like which causes the etching of the glass. The glass substrate is produced after going through the foregoing washing step.

EXAMPLES

The Examples of the present invention are now explained, and compared with the Comparative Examples.

(Glass Composition)

The following four types were prepared as the composition of the glass material.

TABLE 1

| | COMPOSITION RATIO (MASS %) | | | | | | | | | | | | |
|---|---|---|---|---|---|---|---|---|---|---|---|---|---|
| | R | | | R' | | | | | | | | | |
| | $Li_2O$ | $Na_2O$ | $K_2O$ | MgO | CaO | $Al_2O_3$ | $SiO_2$ | $TiO_2$ | $ZrO_2$ | $CeO_2$ | $SnO_2$ | $Nb_2O_5$ | TOTAL |
| GLASS MATERIAL 1 | 7.3 | 3.0 | 1.8 | 2.4 | 0.0 | 14.2 | 65.0 | 1.9 | 0.0 | 2.0 | 0.0 | 2.4 | 100.0 |
| GLASS MATERIAL 2 | 3.6 | 11.1 | 0.4 | 0.6 | 1.6 | 14.7 | 64.8 | 0.0 | 2.0 | 0.5 | 0.7 | 0.0 | 100.0 |
| GLASS MATERIAL 3 | 3.6 | 11.1 | 0.4 | 0.6 | 1.6 | 14.7 | 64.3 | 0.0 | 2.0 | 1.0 | 0.7 | 0.0 | 100.0 |
| GLASS MATERIAL 4 | 3.6 | 11.1 | 0.4 | 0.6 | 1.6 | 14.7 | 63.3 | 0.0 | 2.0 | 2.0 | 0.7 | 0.0 | 100.0 |

Example 1

A glass material 1 was subject to a roughening step, an end face mirror polishing step, and a lapping step via well-known methods to obtain a glass substrate precursor. The glass substrate precursor to which the lapping step was performed was subject to a rough polishing step using a polyurethane-based hard polishing pad. In the rough polishing step, cerium oxide containing 5 mass % or less as a fluorine content was used as the main component, a polishing material having an average grain size of 1 μm was supplied to the glass substrate precursor, and the hard polishing pad and the glass substrate precursor were relatively moved so as to subject the main surface of the glass substrate precursor to rough polishing.

Subsequently, the washing step was performed. In the washing step, the glass substrate precursor was washed using an alkali detergent of pH 13, and then rinsed. Thereafter, the glass substrate precursor was washed using an acid-based detergent (nitric acid) of pH 0, rinsed, and finally washed with HF (0.1% solution). The application conditions were as follows; namely, 40 kHz with an alkali detergent, 80 kHz with a pickling agent, and 170 kHz with a HF detergent.

After the washing step, the precision polishing step was performed. In the precision polishing step, 30 liters of slurry containing colloidal silica having an average grain size of 20 nm, which is smaller than the grain size of the cerium-based polishing material used in the rough polishing step, was cyclically used. This slurry was supplied to the glass substrate precursor after the completion of the washing step, and the polishing pad and the glass substrate precursor were relatively slid to subject the surface of the glass substrate precursor to mirror polishing. The machining allowance (Y) to be polished in the precision polishing was set to 0.8 μm. Moreover, when the left-hand side (X×Z)×b/a of Formula (2) is (c) μm, data of cyclic use was set so that (c) becomes 2.9 μm in the foregoing conditions in consideration of the balance between the composition ratio of the glass substrate precursor and slurry, and the machining allowance (Y).

Example 2

A glass material 2 was subject to a roughening step, an end face mirror polishing step, and a lapping step via well-known methods to obtain a glass substrate precursor. This glass substrate precursor was subject to the rough polishing step and the washing step of Example 1, and the machining allowance (Y) of Example 1 was changed to 1.9 upon performing the precision polishing step. Moreover, in the washing step, data of cyclic use was set so that (c) becomes 1.7 μm in the foregoing conditions.

Example 3

A glass material 3 was subject to a roughening step, an end face mirror polishing step, and a lapping step via well-known methods to obtain a glass substrate precursor. This glass substrate precursor was subject to the rough polishing step and the washing step of Example 1, and the machining allowance (Y) of Example 1 was changed to 1.0 upon implementing the precision polishing step. Moreover, in the washing step, data of cyclic use was set so that (c) becomes 1.8 μm in the foregoing conditions.

Example 4

A glass material 4 was subject to a roughening step, an end face mirror polishing step, and a lapping step via well-known methods to obtain a glass substrate precursor. This glass substrate precursor was subject to the rough polishing step and the washing step of Example 1, and the machining allowance (Y) of Example 1 was changed to 1.0 upon implementing the precision polishing step. Moreover, in the washing step, data of cyclic use was set so that (c) becomes 2.5 μm in the foregoing conditions.

Example 5

A glass material 4 was subject to a roughening step, an end face mirror polishing step, and a lapping step via well-known methods to obtain a glass substrate precursor. This glass substrate precursor was subject to the rough polishing step, the washing step, and the precision polishing step under the same conditions as Example 1.

Example 6

A glass material 4 was subject to a roughening step, an end face mirror polishing step, and a lapping step via well-known methods to obtain a glass substrate precursor. This glass substrate precursor was subject to the rough polishing step under the same conditions as Example 1. Subsequently, the washing step was performed under the following conditions.

The glass substrate precursor after the rough polishing step was washed in order using an alkali detergent, nitric acid, an alkali detergent, and HF. The ultrasonic waves that were applied during the respective washing steps were respectively as follows; namely, alkali detergent (US40 kHz), nitric acid (US80 kHz), alkali detergent (950 kHz), and HF (170 kHz). Degassing was performed in the respective baths, in particular the ultrasonated bath of the alkali detergent (950 kHz) prior to performing the washing step. The precision polishing step was thereafter performed as with Example 1.

Examples 7 to 11

A glass material 3 was subject to a roughening step, an end face mirror polishing step, and a lapping step via well-known methods to obtain a glass substrate precursor. This glass substrate precursor was subject to the rough polishing step, the washing step, and the precision polishing step under the same conditions as Example 1.

Moreover, in order to confirm the effects of Formula (2), the machining allowance (Y) was respectively changed to 1.5 μm (Example 7), 1.2 μm (Example 8), 0.8 μm (Example 9), 0.5 μm (Example 10), and 0.2 μm (Example 11) so that the value of (c) becomes 2.7 μm (Example 7), 2.1 μm (Example 8), 1.4 μm (Example 9), 0.9 μm (Example 10), and 0.4 μm (Example 11) in the foregoing conditions.

Comparative Example 1

A glass material 4 was subject to a roughening step, an end face mirror polishing step, and a lapping step via well-known methods to obtain a glass substrate precursor. This glass substrate precursor was subject to the rough polishing step under the same conditions as Example 1.

Subsequently, in substitute for the washing step of Example 1, a wash solution obtained by mixing citric acid, sulfamic acid, and HF was used, and ultrasonic waves of 120 kHz were applied for the washing step, and used as a Comparative Example. Moreover, in the washing step, data of cyclic use was set so that (c) becomes 2.9 μm in the foregoing conditions. The precision polishing step was thereafter performed under the same conditions as Example 1.

Evaluation Method

In the respective Examples 1 to 11 and Comparative Example 1, the number of cyclic uses in the precision polishing step was evaluated based on cerium content and surface roughness.

As a method of examining the cerium content, the cerium adhesion amount (Q) $ng/cm^2$ of the obtained glass substrate surface was measured with a standard Inductively Coupled Plasma Mass Spectrometry (ICP-MS), and the average value of 10 glass substrates was calculated.

Moreover, the slurry was cyclically used 20 times in the precision polishing step, and the quality was evaluated in the four levels of very good, good, fair, poor in the 5th cyclic use, the 7th cyclic use, and the 20th cyclic use. The evaluation was based on the surface roughness Ra in the respective cyclic uses (5th cyclic use, 7th cyclic use, and 20th cyclic use). The surface roughness Ra is the surface roughness of a square area (5 μm×5 μm) of the main surface of the glass substrate that was subject to the washing treatment, and 10 glass substrates were observed with an atomic force microscope (AFM) and evaluated as follows.

Very good: Average surface roughness Ra is 0.3 Å nm or more and less than 1.0 Å.
Good: Average surface roughness Ra is 1.0 Å or more and less than 1.5 Å.
Fair: Average surface roughness Ra is 1.5 Å or more and less than 2.0 Å.
Poor: Average surface roughness Ra is 2.0 Å or more.

the precision polishing step 20 times. Meanwhile, with Comparative Example 1 in which precision polishing was performed with the cerium content of the glass material surface taking on a greater value than 0.125 $ng/cm^2$, the evaluation of the cyclic use of the slurry was inferior in all cases.

Note that the foregoing embodiments merely illustrated preferred specific examples of the present invention, and the present invention is not limited to the foregoing Examples. It goes without saying that the present invention may be variously modified within the scope of claims of the present invention.

While the present specification discloses the various embodiments of technology as described above, the main technologies thereof can be summarized as follows.

The present invention is a method of producing a glass substrate for an information recording medium, this method comprising: a rough polishing step of performing a rough polishing on a glass material containing 0.01 to 2 mass % of cerium oxide; a washing step of washing the glass material after the rough polishing step, so that the cerium content of the glass material surface becomes 0.125 $ng/cm^3$ or less; and a precision polishing step of performing precision polishing on the glass material after the washing step by cyclically using a polishing material containing colloidal silica.

The expression "cerium content of the glass material surface" is a concept that includes the cerium oxide that eluted from the glass material in addition to the cerium oxide remaining on the surface after the rough polishing step. In this embodiment, prior to performing the precision polishing step, since the glass material that was subject to rough polishing is washed so that the cerium oxide of the glass material surface

TABLE 2

| | GLASS MATERIAL | CERIUM CONTENT ($ng/cm^2$) | MACHINING ALLOWANCE (μm) | C (μg/l) | EVALUATION UPON PREDETERMINED NUMBER OF CYCLICALLY USES | | |
|---|---|---|---|---|---|---|---|
| | | | | | 5TH CYCLIC USE | 7TH CYCLIC USE | 20TH CYCLIC USE |
| EXAMPLE 1 | GLASS MATERIAL 1 | 0.1210 | 0.8 | 2.9 | VERY GOOD | VERY GOOD | GOOD |
| EXAMPLE 2 | GLASS MATERIAL 2 | 0.1100 | 1.9 | 1.7 | VERY GOOD | VERY GOOD | VERY GOOD |
| EXAMPLE 3 | GLASS MATERIAL 3 | 0.1220 | 1.0 | 1.8 | VERY GOOD | VERY GOOD | VERY GOOD |
| EXAMPLE 4 | GLASS MATERIAL 4 | 0.1090 | 0.7 | 2.5 | VERY GOOD | VERY GOOD | VERY GOOD |
| EXAMPLE 5 | GLASS MATERIAL 4 | 0.1210 | 0.6 | 2.8 | VERY GOOD | VERY GOOD | GOOD |
| EXAMPLE 6 | GLASS MATERIAL 4 | 0.0989 | 0.6 | 2.8 | VERY GOOD | VERY GOOD | GOOD |
| EXAMPLE 7 | GLASS MATERIAL 3 | 0.1190 | 1.5 | 2.7 | VERY GOOD | VERY GOOD | VERY GOOD |
| EXAMPLE 8 | GLASS MATERIAL 3 | 0.1210 | 1.2 | 2.1 | VERY GOOD | VERY GOOD | VERY GOOD |
| EXAMPLE 9 | GLASS MATERIAL 3 | 0.1230 | 0.8 | 1.4 | VERY GOOD | GOOD | GOOD |
| EXAMPLE 10 | GLASS MATERIAL 3 | 0.1210 | 0.5 | 0.9 | GOOD | GOOD | GOOD |
| EXAMPLE 11 | GLASS MATERIAL 3 | 0.1210 | 0.2 | 0.4 | GOOD | GOOD | GOOD |
| COMPARATIVE EXAMPLE 1 | GLASS MATERIAL 4 | 0.5230 | 0.8 | 2.9 | POOR | POOR | POOR |

As evident from Table 2, with Examples 1 to 11 where a glass material containing 0.01 to 2 mass % of cerium oxide was subject to rough polishing, and precision polishing was performed so that the cerium content of the glass material surface becomes 0.125 $ng/cm^2$ or less, superior evaluation results were obtained even after cyclically using the slurry in becomes a small amount (0.125 $ng/cm^2$ or less), the cerium oxide which causes the clumping of colloidal silica is reduced. Thus, the number of times that the polishing material can be cyclically used will increase, and the productivity will also improve. In addition, since the washing step is performed before the precision polishing step, even when a glass material containing 0.01 to 2 mass % of cerium oxide is used, it is possible to inhibit the clumping of the slurry in the precision polishing step. Accordingly, even when an environment-friendly material is used, it is possible to improve the productivity. Furthermore, since the amount of cerium adhered to the glass material is reduced before the precision polishing step, it is possible to ensure the cleanliness of the final glass substrate. In addition, strong acid is required since cerium oxide has difficult solubility. Nevertheless, strong acid deteriorate the smoothness of the glass substrate (glass material). Consequently, in this embodiment, the washing step is carried out before the final precision polishing step so as to dissolve and wash cerium. Thus, even when strong acid is used, there will be no adverse effect on the smoothness of the glass substrate. Moreover, the smoothness of the glass substrate as the final product will also improve.

As a preferred embodiment, after the washing step, a machining allowance of the glass material in the precision polishing step is 0.2 to 2 μm, and when a volume of a slurry used as the polishing material in the precision polishing step is (a) liters, the number of the glass materials to be polished is (b), cerium oxide content of the glass material is (X) mass %, and the machining allowance is (Y) μm, $$\text{and } Z = Y \times \text{substrate area (cm}^2\text{)} \times \text{substrate density (g/cm}^3\text{)} \quad (1)$$

the precision polishing step cyclically uses the polishing material so as to satisfy the following formula:

$$(X \times Z) \times b/a < 3 \text{ (μg/l)} \quad (2)$$

In this embodiment, upon managing the number of times of cyclically using the slurry that is used as the polishing material in the precision polishing step, it is possible to obtain the optimal maximum number of cyclic uses by giving consideration to the cerium oxide of the glass material to be polished.

As a preferred embodiment, the rough polishing step uses cerium oxide as the polishing material. In this embodiment, Si is cut off at the surface of the glass material based on the polishing mechanism of the cerium oxide, and highly productive polishing can be realized. In addition, since a considerable amount of the residual cerium oxide is removed in the washing step, not only is it possible to maintain the high level of cleanliness of the glass material, it is also possible to inhibit, as much as possible, the infliction of an adverse effect to the polishing material in the precision polishing step to be performed after the washing step. Accordingly, it is possible to maintain a high level of smoothness, a high level of cleanliness, and a high level of productivity.

As a preferred embodiment, the glass material has following composition:
55 mass % to 75 mass % of $SiO_2$
5 mass % to 18 mass % of $Al_2O_3$
1 mass % to 10 mass % of $Li_2O$
3 mass % to 15 mass % of $Na_2O$
0.1 mass % to 5 mass % of $K_2O$,
where a total amount of $Li_2O+Na_2O+K_2O$ is 10 mass % to 25 mass %,
0.1 mass % to 5 mass % of MgO
0.1 mass % to 5 mass % of CaO
0 mass % to 8 mass % of $ZrO_2$, and
$0.10 \leq (MgO+CaO)/(Li_2O+Na_2O+K_2O) \leq 0.80$.

As another preferred embodiment, the glass material contains:
65 mass % to 90 mass % in a total amount of $SiO_2+Al_2O_3+B_2O_2$
wherein
45 mass % to 75 mass % of $SiO_2$
1 mass % to 20 mass % of $Al_2O_3$,
0 mass % to 8 mass % of $B_2O_3$,
7 mass % to 20 mass % in a total amount of $R_2O$,
wherein R=Li, Na, K,
0.1 mass % to 12 mass % in a total amount of R'O,
wherein R'=Mg, Ca, Sr, Ba, Zn,
0.5 mass % to 10 mass % in a total amount of $TiO_2+ZrO_2$, and wherein
the glass material contains at least one type of polyvalent element selected from a group of V, Mn, Ni, Mo, Sn, Ce and Bi, and
when oxides of the polyvalent elements are respectively $V_2O_5$, $MnO_2$, $Ni_2O_3$, $MoO_3$, $SnO_2$, $CeO_2$, and $Bi_2O_3$, a molar ratio of a total amount of oxides of the polyvalent elements relative to a total amount of $TiO_2+ZrO_2$ (total amount of oxides of the polyvalent element/(total amount of $TiO_2+ZrO_2$)) is within a range of 0.05 to 0.50.

As explained above, according to the present invention, prior to performing the precision polishing step, since the glass material that was subject to rough polishing is washed so that the cerium of the glass material surface becomes a small amount, the number of times that the polishing material can be cyclically used will increase, and the productivity will also improve. Moreover, the smoothness of the glass substrate as the final product will also improve. In addition, even when a glass material containing 0.01 to 2 mass % of cerium oxide is used, it is possible to inhibit the clumping of the slurry in the precision polishing step. Accordingly, even when an environment-friendly material is used, it is possible to improve the productivity. In addition, it is possible ensure the cleanliness of the final glass substrate and, even when strong acid is used, there will be no adverse effect on the smoothness of the glass substrate. Thus, according to the present invention, it is possible to ensure a high level of smoothness, a high level of cleanliness, and a high level of environmental friendliness. In addition, it is possible to increase the number of times that colloidal silica can be cyclically used upon subjecting the glass material containing cerium oxide in the composition thereof to precision polishing, and a significant effect is consequently yielded in that the productivity can be improved dramatically.

The present invention is also a glass substrate for an information recording medium produced with the foregoing method of producing a glass substrate for an information recording medium.

This application relates to and claims priority from Japanese Patent Application No. 2010-75324, filed on Mar. 29, 2010, the entire disclosure of which is incorporated herein by reference.

While the present invention was appropriately and sufficiently explained above based on the embodiments with reference to the drawings in order to represent the present invention, it should be recognized that a person skilled in the art can easily modify and/or improve the foregoing embodiment. Accordingly, so as long as the modified embodiment or improved embodiment implemented by a person skilled in the art does not deviate from the scope of claims indicated in the claims, such modified embodiment or improved embodiment should be interpreted as being covered by the present scope of claims.

The invention claimed is:
1. A method of producing a glass substrate for an information recording medium, comprising:
a rough polishing step of performing a rough polishing on a glass material containing 0.01 to 2 mass % of cerium oxide;

a washing step of washing the glass material after the rough polishing step, so that the cerium content of the glass material surface becomes 0.125 ng/cm$^2$ or less; and a precision polishing step of performing precision polishing on the glass material after the washing step by cyclically using a volume of a slurry of a polishing material containing colloidal silica, wherein after the washing step, a machining allowance of the glass material in the precision polishing step is 0.2 to 2 μm, and when the volume of the slurry of the polishing material in the precision polishing step is (a) liters, the number of the glass materials to be polished by cyclically using the volume of the slurry of the polishing material is (b), cerium oxide content of the glass material is (X) mass %, and the machining allowance is (Y) μm, and $$Z = Y \times \text{substrate area (cm}^2\text{)} \times \text{substrate density (g/cm}^3\text{)} \quad (1)$$

the precision polishing step cyclically uses the volume of the slurry of the polishing material so as to satisfy the following formula:

$$(X \times Z) \times b/a < 3 \; (\mu g/l) \quad (2).$$

2. The method of producing a glass substrate for an information recording medium according to claim 1, wherein the rough polishing step uses cerium oxide as the polishing material.

3. The method of producing a glass substrate for an information recording medium according to claim 1, wherein the glass material has following composition:
- 55 mass % to 75 mass % of $SiO_2$
- 5 mass % to 18 mass % of $Al_2O_3$
- 1 mass % to 10 mass % of $Li_2O$
- 3 mass % to 15 mass % of $Na_2O$
- 0.1 mass % to 5 mass % of $K_2O$,
- where a total amount of $Li_2O+Na_2O+K_2O$ is 10 mass % to 25 mass %,
- 0.1 mass % to 5 mass % of MgO
- 0.1 mass % to 5 mass % of CaO
- 0 mass % to 8 mass % of $ZrO_2$, and
- $0.10 \leq (MgO+CaO)/(Li_2O+Na_2O+K_2O) \leq 0.80$.

4. The method of producing a glass substrate for an information recording medium according to claim 1, wherein the glass material is a glass material that contains:
- 65 mass % to 90 mass % in a total amount of $SiO_2+Al_2O_3+B_2O_2$
wherein
- 45 mass % to 75 mass % of $SiO_2$
- 1 mass % to 20 mass % of $Al_2O_3$,
- 0 mass % to 8 mass % of $B_2O_3$,
- 7 mass % to 20 mass % in a total amount of $R_2O$,
  wherein R=Li, Na, K,
- 0.1 mass % to 12 mass % in a total amount of R'O,
  wherein R'=Mg, Ca, Sr, Ba, Zn,
- 0.5 mass % to 10 mass % in a total amount of $TiO_2+ZrO_2$,
and wherein
the glass material contains at least one type of polyvalent element selected from a group of V, Mn, Ni, Mo, Sn, Ce and Bi, and
when oxides of the polyvalent elements are respectively $V_2O_5$, $MnO_2$, $Ni_2O_3$, $MoO_3$, $SnO_2$, $CeO_2$, and $Bi_2O_3$, a molar ratio of a total amount of oxides of the polyvalent elements relative to a total amount of $TiO_2+ZrO_2$ (total amount of oxides of the polyvalent element/(total amount of $TiO_2+ZrO_2$)) is within a range of 0.05 to 0.50.

* * * * *